(12) United States Patent
Yoshiura (10) Patent No.: US 7,684,617 B2
(45) Date of Patent: Mar. 23, 2010

(54) APPARATUS AND METHODS FOR PROCESSING IMAGES

(75) Inventor: Takeshi Yoshiura, Ayabe (JP)

(73) Assignee: OMRON Corporation, Kyoto (JP)

( * ) Notice: Subject to any disclaimer, the term of this patent is extended or adjusted under 35 U.S.C. 154(b) by 767 days.

(21) Appl. No.: 11/592,753

(22) Filed: Nov. 2, 2006

(65) Prior Publication Data

US 2007/0133871 A1    Jun. 14, 2007

(30) Foreign Application Priority Data

Nov. 4, 2005    (JP)    ............... 2005-320680

(51) Int. Cl.
G06K 9/00    (2006.01)
(52) U.S. Cl. .................. 382/167; 382/162; 382/163
(58) Field of Classification Search .............. 382/25, 382/162, 163, 167; 375/E7.077, E7.81
See application file for complete search history.

(56) References Cited

U.S. PATENT DOCUMENTS 6,058,211 A *  5/2000  Bormans et al. ............ 382/235

FOREIGN PATENT DOCUMENTS

JP    5-41867    2/1993
JP    2002-271630    9/2002

OTHER PUBLICATIONS

JP patent application No. 2005-320680, Notification of Reason for Refusal mailed Nov. 18, 2008.

* cited by examiner

*Primary Examiner*—Anh Hong Do
(74) *Attorney, Agent, or Firm*—Weaver Austin Villeneuve & Sampson LLP (57) ABSTRACT

In one embodiment, a system for processing an image receives color information including three variables representing a color of each of a plurality of pixels which constitute the image. The system derives a target characteristic value corresponding to a target pixel among the plurality of pixels based on the three variables of the target pixel. The system derives proximate characteristic values corresponding to a plurality of proximate pixels which are proximate to the target pixel. The system replaces the three variables of the target pixel with the three variables of one of the proximate pixels depending on a relationship between the target characteristic value and the proximate characteristic values.

17 Claims, 6 Drawing Sheets

|  | (0,0) | (1,0) | (2,0) | (3,0) | | | FM1 |
|---|---|---|---|---|---|---|---|
| | (R,G,B)<br>=(122,122,0)<br>D=244 | (R,G,B)<br>=(120,130,0)<br>D=250 | (R,G,B)<br>=(140,125,0)<br>D=265 | (R,G,B)<br>=(120,128,0)<br>D=248 | (R,G,B)<br>=(118,120,0)<br>D=238 | (R,G,B)<br>=(126,120,0)<br>D=246 | |
| | | (1,1) | (2,1) | (3,1) | (4,1) | | |
| | (R,G,B)<br>=(130,110,0)<br>D=240 | (R,G,B)<br>=(128,128,0)<br>D=256 | (R,G,B)<br>=(126,126,0)<br>D=252 | (R,G,B)<br>=(70,30,0)<br>D=100 | (R,G,B)<br>=(90,20,0)<br>D=110 | (R,G,B)<br>=(118,116,0)<br>D=234 | |
| | | | (2,2) | (3,2) | (4,2) | (5,2) | |
| | (R,G,B)<br>=(124,108,0)<br>D=232 | (R,G,B)<br>=(118,118,0)<br>D=236 | (R,G,B)<br>=(120,122,0)<br>D=242 | (R,G,B)<br>=(116,114,0)<br>D=230 | (R,G,B)<br>=(122,122,0)<br>D=244 | (R,G,B)<br>=(110,130,0)<br>D=240 | |

*FIG. 4A*

|  |  | (2,0) | (3,0) |  |  | FM2 |
|---|---|---|---|---|---|---|
| | (1,1) | (2,1) | (3,1) | (4,1) | | |
| | (R,G,B)<br>=(140,125,0)<br>(D=265) | (R,G,B)<br>=(140,125,0)<br>(D=265) | (R,G,B)<br>=(140,125,0)<br>(D=265) | (R,G,B)<br>=(120,128,0)<br>(D=248) | | |
| | | | | | | |

*FIG. 4B*

|  20a | | MSK |
|---|---|---|
| (R,G,B)<br>=(120,120,0)<br>D=240 | (R,G,B)<br>=(118,120,0)<br>D=238 | (R,G,B)<br>=(118,188,0)<br>D=236 |
| (R,G,B)<br>=(110,118,0)<br>D=228 | (R,G,B)<br>=(70,30,0)<br>D=100 | (R,G,B)<br>=(116,110,0)<br>D=226 |
| (R,G,B)<br>=(116,120,0)<br>D=236 | (R,G,B)<br>=(112,122,0)<br>D=234 | (R,G,B)<br>=(10,130,0)<br>D=240 |

FIG. 6 ured product using an optical sensor. Examples of such an optical sensor include CCD (charge coupled device) or CMOS (complementary Metal Oxide Semiconductor) sensors which are capable of capturing two-dimensional images of a target object of interest.

APPARATUS AND METHODS FOR PROCESSING IMAGES

This application claims priority from Japanese Patent Application JP2005-320680 filed on Nov. 4, 2005, which is hereby incorporated by reference in its entirety for all purposes.

TECHNICAL FIELD

The present disclosure relates generally to image processing, and more specifically to processing images represented by multiple colors.

BACKGROUND

Various sensors including optical sensors have been used to achieve laborsaving and efficient factory automation. Image processors have been used to manage manufacturing processes by capturing an image of a product or a semimanufactured product using an optical sensor. Examples of such an optical sensor include CCD (charge coupled device) or CMOS (complementary Metal Oxide Semiconductor) sensors which are capable of capturing two-dimensional images of a target object of interest.

Some image processors preprocess the captured image by performing a correction process on the original image. Examples of such a correction process include filtering processes for eliminating noises and contrast processes for adjusting an average brightness of the image. Dilating processes and eroding processes on captured images have been known as image filtering processes. An example of the dilating and eroding process is described at page 85 of "Image Processing Standard Textbook—Image Processing" published on Feb. 25, 1997 by Computer Graphic Arts Society, Japan.

Over the past few years, pattern searches and edge detection using color images are becoming prevalent. In conventional systems, the dilating/eroding process has been applied to each of three image planes corresponding to three primary colors (e.g., red, green, and blue colors). Such systems have not been able to eliminate noises well, but rather have been susceptible to generation of "false color" noises.

In view of the above, it would be desirable to have improved systems which are capable of suppressing noises for color images.

SUMMARY

The invention described herein provides methods, apparatus, and software for processing images represented by multiple colors.

In an example embodiment, an apparatus for processing an image is provided. The apparatus includes an interface configured to receive color information including three variables representing a color of each of a plurality of pixels which constitute the image. The apparatus further includes a processor configured to derive a target characteristic value corresponding to a target pixel among the plurality of pixels based on the three variables of the target pixel, derive proximate characteristic values corresponding to a plurality of proximate pixels which are proximate to the target pixel, and replace the three variables of the target pixel with the three variables of one of the proximate pixels depending on a relationship between the target characteristic value and the proximate characteristic values.

In another example embodiment, a method for processing an image is provided. The method includes receiving color information including three variables representing a color of each of a plurality of pixels which constitute the image; deriving a target characteristic value corresponding to a target pixel among the plurality of pixels based on the three variables of the target pixel; deriving proximate characteristic values corresponding to a plurality of proximate pixels which are proximate to the target pixel; and replacing the three variables of the target pixel with the three variables of one of the proximate pixels depending on a relationship between the target characteristic value and the proximate characteristic values.

In still another example embodiment, software encoded in one or more computer readable media is provided. When executed, the software is operable to receive color information including three variables representing a color of each of a plurality of pixels which constitute the image; derive a target characteristic value corresponding to a target pixel among the plurality of pixels based on the three variables of the target pixel; derive proximate characteristic values corresponding to a plurality of proximate pixels which are proximate to the target pixel; and replace the three variables of the target pixel with the three variables of one of the proximate pixels depending on a relationship between the target characteristic value and the proximate characteristic values.

These and other features and advantages of the invention will be described in more detail below with reference to associated drawings.

BRIEF DESCRIPTION OF THE DRAWINGS

The invention may best be understood by reference to the following description taken in conjunction with the accompanying drawings, which illustrate specific embodiments of the present invention. In the drawings, similar reference numerals/symbols correspond to similar elements.

DESCRIPTION OF EXAMPLE EMBODIMENTS

Figure 1:
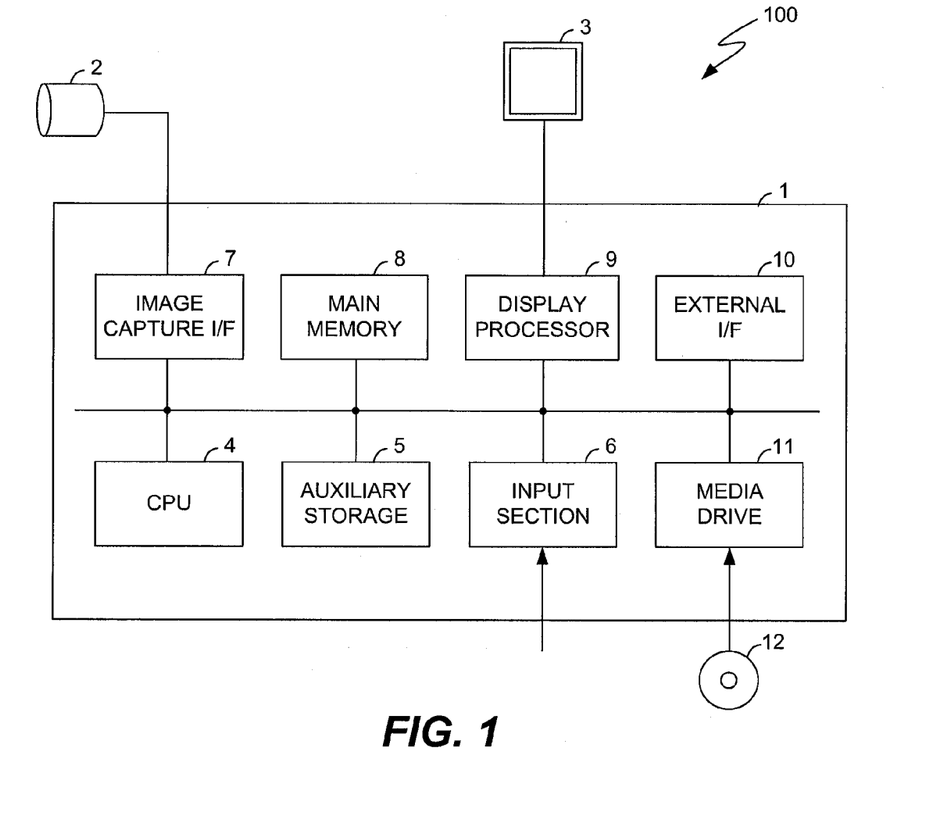
FIG. 1 illustrates a schematic diagram of image sensing apparatus including an image processor according to an example embodiment of the invention.

Overview FIG. 1 illustrates a schematic diagram of image sensing apparatus 100 including an image processor 1 according to an example embodiment of the invention. Referring to FIG. 1, the image sensing apparatus 100 includes the image processor 1, an image capturing device 2, and a display device 3. The image capturing device 2 captures an image of an object. An example of such an object to be imaged includes, for example, a product which is being conveyed on a manufacturing line.

The image processor 1 then performs various image processings such as pattern searches or edge detection on the captured image of the object. The image processor 1 outputs the processed image to the display device 3 for display purposes. Alternatively, the image processor 1 may output the processed image to other devices (not shown).

The image capturing device 2 may include a capturing device such as a CCD or CMOS sensor, and a lens to capture an image of the object of interest, and to outputs the captured image to the image processor 1. The captured image may be a still image or moving pictures. When the device 2 captures and outputs moving images of the object, the image processor 1 may process each of multiple images, or only some of the images decimated with respect to time.

The display device 3 displays to the user resultant output processed by the image processor 1, or the image of the object captured by the image capturing device 2. Examples of the display device 3 include an LCD (liquid crystal display), a plasma display, an EL (electroluminescence) display, etc.

The image processor 1 may include a CPU (central processing unit) 4, an auxiliary storage 5, an input section 6, an image capture I/F (interface) 7, a main memory 8, a display processor 9, an external I/F 10, a media drive 11, and a bus 13. All or some of the functionality of the image processor 1 may be implemented by any suitable combination of hardware and software. Examples of the hardware to implement at least some of the image processor 1 are a general-purpose computer (e.g., a personal computer), an I/F card, an ASIC (application-specific integrated circuit), etc.

The image capture I/F 7 electrically couples the image capturing device 2 to the bus 13. The image capture I/F 7 receives an image signal output by the image capturing device 2, performs suitable signal conversion on the image signal to retrieve color information of pixels constituting the captured image, and outputs the obtained color information to the CPU 4 via the bus 13. The received image signal typically represents a two-dimensional image frame consisting of N pixels in the x direction (e.g., a horizontal direction) and M pixels in the y direction (e.g., a vertical direction). Each of N×M pixels has an 8 bit (i.e., 256 level) grayscale of each of a red color, a green color, and a blue color.

By way of example, the image capture I/F 7 performs frame synchronization on the received signal from the image capturing device 2, and obtains three variables each representing the red color, the green color, and the blue color of each pixel (hereinafter, referred to as "RGB information") by decoding the color information of each pixel which is transmitted in an expanded manner along the time axis. In this example embodiment of the invention, the image capture I/F 7 outputs data representing a grayscale value having 256 levels for each of the red color, the green color, and the blue color with respect to each pixel. However, as those skilled in the art would appreciate, the image capture I/F 7 may output different formats of data representing colors of pixels.

The main memory 8 stores suitable data including program data executed by the CPU 4, image data captured by the image capturing device 2, and image data which is being processed by the CPU 4. The main memory 8 may be implemented by suitable semiconductor devices such as DRAMs (dynamic random access memories), and SRAMs (static random access memories).

The display processor 9 receives the image processed by the CPU 4, the image captured by the image capturing device 2, an image prompting the user to input data, an image showing a processing status of the CPU 4, etc., performs suitable signal/data processing, and then outputs a resulting image signal to the display device 3.

The external I/F 10 outputs the result processed by the CPU 4 to an external device. Examples of the external I/F 10 include a DO (digital output) implemented by, for example, photodiodes, transistors, or relays, and communication mechanisms such as USB (universal serial bus), RS-232C (Recommended Standard 232 version C), IEEE (Institute of Electrical and Electronic Engineers) 1394, SCSI (small computer system interface), and Ethernet®.

The auxiliary storage 5 provides a non-volatile storage area for storing the images captured by the image capturing device 2, and the images and the result processed by the CPU 4. Examples of the auxiliary storage 5 include HDDs (hard disk drives), and semiconductor memory devices such as flash memory cards, SD (Secure Digital) memory cards, IC (integrated circuit) memory cards, etc.

The input section 6 receives various configurations or instructions input by the user using an input device, and outputs data representing such configurations or instructions to the CPU 4 via the bus 13. Examples of the input device include keyboards, mice, touch pads, touch-sensitive screens, track balls, joy sticks, switches, scanners, etc.

The media drive 11 receives a computer-readable medium 12 which stores suitable data or a program executed by the CPU 4, reads the data or the program from the medium, and then forward it to the auxiliary storage 5 or the main memory 8. The computer-readable medium 12 may be any suitable medium which stores necessary data in a non-volatile manner. Examples of the computer-readable medium 12 are removable media such as CDs (Compact Disk)-R/ROM, DVD (Digital Versatile Disk)-ROMs/RAMs/Rs/RWs, MOs (magneto-optical disk), MDs (MiniDiscs), flexible disks, magnetic tapes, etc.

The CPU 4 receives the RGB information generated from the color image captured by the image capturing device 2, and stores the RGB information of the image in the main memory 8. Usually, the RGB information corresponds to each pixel in the image. As the CPU 4, multiple CPUs may be used for higher processing capability. Hereinafter, for the sake of simplicity, the CPU and its related software/hardware components may be comprehensively referred to as the "CPU" especially when software and hardware are utilized to perform various functions to implement the example embodiment of the invention.

Generally, the CPU 4 determines an area in the captured image which is to be processed, based on, for example, configuration data given by the user through the input section 6. The CPU 4 calculates "characteristic values" corresponding to each of the pixels contained in the determined processing area, based on the RGB information stored in the main memory 8. Depending on the calculated characteristic values, the CPU 4 then corrects the RGB information of the image to reduce noises.

Figure 2:
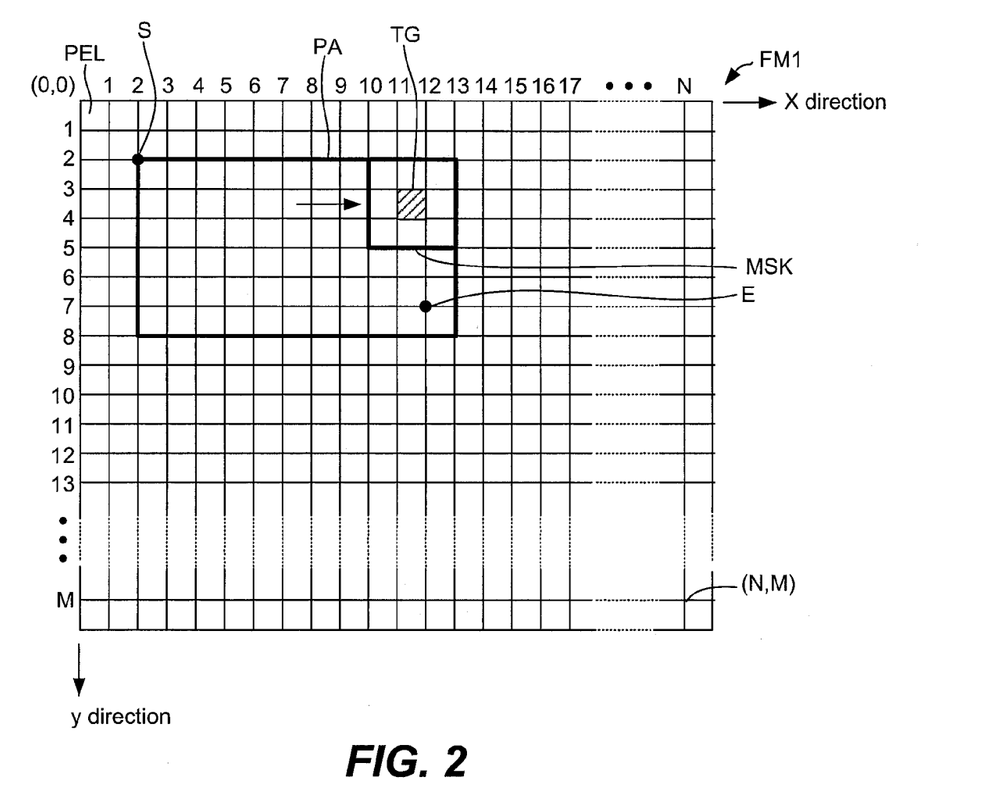
FIG. 2 illustrates a schematic diagram showing a frame memory stored in the main memory.

FIG. 2 illustrates a schematic diagram showing a frame memory FM 1 stored in the main memory 8. The CPU 4 sequentially chooses a single target pixel of interest within the processing area in a predetermined order. When the processing area is a rectangular (e.g., an area labeled as "PA" in FIG. 2, which includes pixels (x, y)=pixel S (2, 2)- pixel E (12, 7)), the CPU 4 may choose such a target pixel TG along the row, scanning the whole processing area row by row. In FIG. 2, the x, y coordinates of a pixel (e.g., (x, y)=(12, 7)) correspond to left upper corner coordinates of the pixel.

The CPU 4 also identifies a plurality of proximate pixels which are proximate to the target pixel. The proximate pixels are pixels which satisfy a certain relative positional relationship with the target pixel on the two-dimensional image plane. An example of the proximate pixels is eight pixels surrounding the target pixel which is a center of the proximate pixels.

As described in detail later, in FIG. 2, when the target pixel is a pixel TG of which location is (x, y)=(11, 3), the proximate pixels are, for example, pixels of which locations are (x, y)=(10, 2), (11, 2), (12, 2), (10, 3), (12, 3), (10, 4), (11, 4), and (12, 4). Here, a square "processing mask" labeled as MSK in FIG. 2 includes, for example, nine pixels, which are the target pixel, and the proximate pixels in this case.

The CPU 4 calculates characteristic values of the target pixel, and the proximate pixels. An example of characteristic values is brightness of the pixel which are typically represented as a sum of the red color value (the R value, e.g., 0-255), the green color value (the G value, e.g., 0-255), and the blue color value (the B value, e.g., 0-255). Alternatively, such a brightness value can be modified by multiplying each of the R, G, and B values by a weight value. For example, the modified brightness can be expressed as w1×R+w2×G+w3×B where $0 \leq w1, w2, w3 \leq 1$.

In the example embodiment of the invention, the CPU 4 derives characteristic values of pixels which are located within the square processing mask MSK having the target pixel as a center, which includes 3 pixels×3 pixels. More generally, the processing mask MSK may contain n pixels in the x direction, and n pixels in the y direction, where n is an odd number, and equal to or more than 3. Alternatively, the processing mask MSK may contain n pixels in the x direction, and m pixels in the y direction, where n and m are natural numbers, and n≠m. When n≠m, the target pixel does not have to be the exact center of the processing mask MSK.

In this example, the CPU 4 calculates characteristic values (for example, brightness values) of the pixels contained in the processing mask MSK. When the target pixel is the pixel TG (x, y)=(11, 3) in FIG. 2, the CPU 4 derives characteristic values of the nine pixels, i.e., (x, y)=(10, 2)-(12, 2), (10, 3)-(12, 3), and (10, 4)-(12, 4) contained in the processing mask MSK.

Among the nine pixels in the processing mask, the CPU 4 then select one pixel (hereinafter, "a candidate pixel") which has, for example, a maximum value of the nine characteristic values corresponding to the pixels in the processing mask. Alternatively, the CPU 4 may select one pixel which has a minimum value or an intermediate value of the nine characteristic values. The way in which the CPU 4 selects the candidate pixel (e.g., based on the maximum, the minimum, or the intermediate value of the nine pixels) may be determined by an external input which the user provides.

The CPU 4 retrieves the RGB information corresponding to the selected candidate pixel from the main memory 8, and store the candidate pixel's RGB information in a different area in the main memory as the RGB information of the target pixel TG. The RGB information of the target pixel TG should remain the same because the RGB information of the pixel TG may be used later once the processing mask MSK is shifted by one pixel. The CPU replace the RGB information of the target pixel TG with the RGB information of the candidate pixel, and then outputs the replaced RGB information for the target pixel TG.

The CPU 4 performs the above-mentioned replacement procedure with respect to all pixels in the processing area ("PA" in FIG. 2) by shifting the target pixel on a pixel by pixel basis, and scanning the whole processing area. The CPU 4 stores the replaced RGB information of the pixels in the processing area, and then outputs the replaced RGB information as a filtered (or processed) image to the display processor 9.

Replacement of RGB Information

The process by the CPU 4 will now be described in detail referring to FIG. 2. The CPU 4 stores the RGB information of each pixel of the image captured by the image capturing device 2 in the frame memory FM1 provided in the main memory 8. The coordinate system in the frame memory FM1 corresponds to the pixels in the captured image as shown in FIG. 2. For example, when the image capturing device 2 captures an image consisting of a matrix of multiple pixels PEL, e.g., (N+1) pixels in the x direction and (M+1) pixels in the y direction, a two-dimensional frame memory FM1 having x, y coordinates (0, 0)-(N, M) is formed in the main memory 8.

The CPU 4 outputs the color image captured by the image capturing device 2 to the display device 3 through the display processor 9. The CPU 4 accepts an input representing a desired processing area from the user. Once the CPU 4 receives the user input regarding the processing area, the CPU 4 identifies the processing area PA within the frame memory FM1 depending on the user input. The processing area PA is represented by, for example, a starting coordinate S, and an ending coordinate E in the frame memory FM1.

Within the processing area PA, the CPU 4 chooses the target pixel TG (e.g., the hatched pixel in FIG. 2), and defines the processing mask MSK which constitutes a matrix of pixels having the target pixel TG as a center of the mask MSK. The CPU 4 calculates the characteristic values (the brightness values in this example) of each of the pixels PEL contained in the processing mask MSK, based on the RGB information of the pixels.

Based on the calculated characteristic values, the CPU 4 then selects the candidate pixel for replacement which satisfies a type (e.g., a maximum, minimum, or intermediate value) which is provided through the input section 6. The CPU 4 replaces the RGB information of the target pixel TG with that of the selected candidate pixel, and stores the replaced RGB information for the target pixel in a separate frame memory (not shown) provided within the main memory 8.

The CPU 4 sequentially chooses the target pixel TG among the pixels in the processing area PA by scanning one pixel by one pixel, and repeats the above-described routine with respect to the chosen target pixel TG.

Figure 3A:
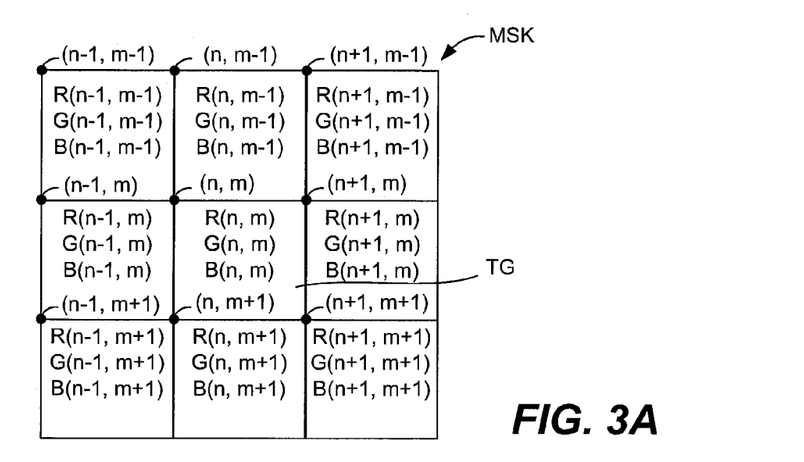
FIGS. 3A-3C illustrate a processing mechanism in the processing mask MSK.
Figure 3B:
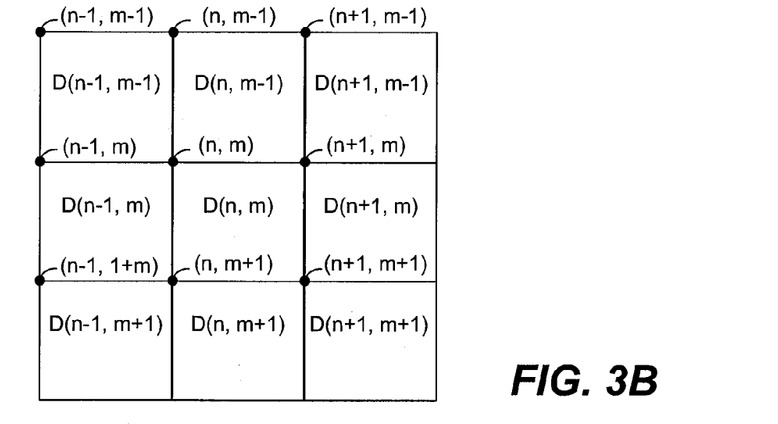
Figure 3C:
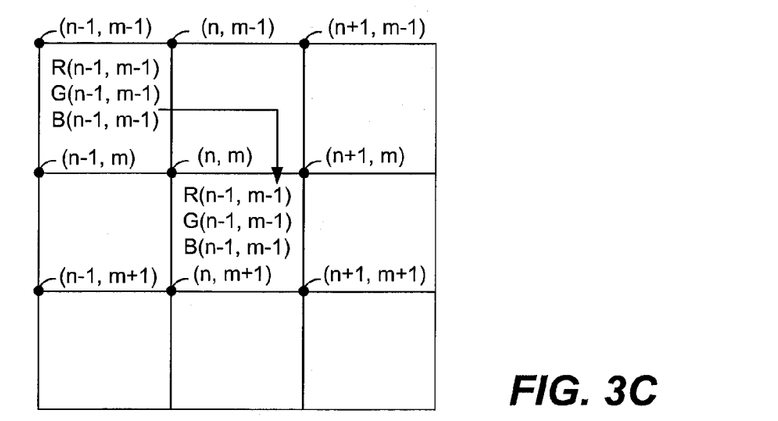

FIGS. 3A-3C illustrate a processing mechanism in the processing mask MSK. FIG. 3A illustrates the RGB information. FIG. 3B illustrates the brightness. FIG. 3C illustrates the replacing process.

Referring to FIG. 3A, in the example embodiment of the invention, the process first defines the processing mask MSK which includes 3 pixels×3 pixels having the target pixel TG as its center. Any suitable pixel size of a rectangular or square processing area may be utilized. However, in some example embodiments, a square processing area including n pixels×n pixels (where n is an odd number, and equal to or more than 3) may be preferable for the purpose of averaging the filtering effects.

The CPU 4 derives the brightness values based on the RGB information of multiple pixels PEL contained in the defined processing mask MSK. Specifically, The frame memory stores the R (red), G (green), and B (blue) values corresponding to each of the pixels PEL. For the sake of simplicity, these stored RGB values can be considered as functions of the coordinates (x, y), and thus, can be described as R(x, y), G(x, y), and B(x, y). Then, the brightness D(x, y) at the pixel PEL (x, y) is expressed by the following equation:

$$D(x, y)=R(x, y)+G(x, y)+B(x, y). \tag{1}$$

According to the equation 1, the CPU 4 calculates the brightness values of all pixels included in the processing mask MSK.

Now referring to FIG. 3B, the CPU 4 stores the brightness value of each pixel in the main memory 8 temporarily, in a manner where the brightness values D are associated with the corresponding associated pixels PEL. The CPU 4 compares the brightness values among the pixels stored in the processing mask MSK, and selects the candidate pixel which satisfies a processing type (e.g., a maximum, minimum, or intermediate value among the brightness values of the pixels). Such a type is typically provided through the input section 6 by the user. However, in other instances, the processing type may be provided by other suitable mechanisms.

The CPU 4 then retrieves the RGB values of the selected candidate pixel from the main memory 8, and replace the RGB values of the target pixel with those of the candidate pixel.

Referring to FIG. 3C, when the pixel (n−1, m−1) has a brightness value which satisfies the type of the processing, the CPU 4 replaces the RGB information of the target pixel TG (n, m) with that of the candidate pixel (n−1, m−1), and outputs the replaced RGB values as those of the target pixel. It is noted that the values of the target pixel are now equal to those of the candidate pixel, i.e., R(n−1, m−1), G(n−1, m−1), and B(n−1, m−1). However, the original RGB information of the target pixel shown in FIG. 3A is not changed, but kept the same so that the same original RGB information of the pixel (e.g., shown in FIG. 3A) will be later used when calculating the characteristic values of other proximate pixels as shown in FIG. 3C.

There is a case where the candidate pixel itself is the target pixel. In such a case, the RGB information of the target pixel is replaced with that of itself. In other words, the RGB information of the target pixel is overwritten by the same values. As such, in that case, the RGB information of the target pixel will not be changed even after the replacement process.

In the example embodiment of the invention, the CPU 4 performs one of three types of the process, i.e., a dilating process, a eroding process, and an intermediate process as described in detail below. The type of the process may be set through the input section 6. Specifically, the dilating process is used to reduce noise components caused by a relatively small number of dark (i.e., low-brightness) pixels among a relatively large number of bright pixels. On the other hand, the eroding process is used to reduce noise components caused by a relatively small number of bright (i.e., high-brightness) pixels among a relatively large number of dark pixels. The intermediate process is used to average the overall brightness of the image.

The CPU 4 first determines which type of the processes (e.g., among the dilating, eroding, or intermediate process) should be used, based on an input representing the process type which is received by the input section 6. The CPU 4 selects the candidate pixel which has a characteristic value (e.g., a brightness value) corresponding to one of the maximum, minimum, or intermediate value among the characteristic values of the pixels in the processing mask MSK. In other words, the CPU 4 selects one of the three processing schemes (i)-(iii) described below, depending on the type of the process to be used, e.g., the dilating, eroding, or intermediate process. Here, the coordinates of the target pixel is (n, m); the size of the mask MSK is (2Z+1) pixels x (2Z+1) pixels (Z: a natural number); and the replaced RGB information is R'(n, m), G'(n, m), B'(n, m).

(i) Dilating Process

The CPU 4 selects the candidate pixel (x, y) having the maximum brightness value Dmax among the brightness values in the processing mask MSK according to the following equation 2:

$$D\text{max}=D(x\text{max}, y\text{max})=\max \{D(x, y); n-Z<=x<=n+Z, m-Z<=y<=m+Z\} \quad (2)$$

The CPU 4 replaces the RGB information of the target pixel TG with that of the candidate pixel according to the following equation 3:

$$R'(n, m)=R(x\text{max}, y\text{max}),$$

$$G'(n, m)=G(x\text{max}, y\text{max}), \text{ and}$$

$$B'(n, m)=B(x\text{max}, y\text{max}). \quad (3)$$

(ii) Eroding Process

The CPU 4 selects the candidate pixel (x, y) having the minimum brightness value Dmin among the brightness values in the processing mask MSK according to the following equation 4:

$$D\text{min}=D(x\text{min}, y\text{min})=\min\{D(x, y); n-Z<=x<=n+Z, m-Z<=y<=m+Z\} \quad (4)$$

The CPU 4 replaces the RGB information of the target pixel TG with that of the candidate pixel according to the following equation 5:

$$R'(n, m)=R(x\text{min}, y\text{min}),$$

$$G'(n, m)=G(x\text{min}, y\text{min}), \text{ and}$$

$$B'(n, m)=B(x\text{min}, y\text{min}). \quad (5)$$

(iii) Intermediate Process

The CPU 4 selects the candidate pixel (x, y) having the intermediate brightness value Dmid among the brightness values in the processing mask MSK according to the following equation 6:

$$D\text{mid}=D(x\text{mid}, y\text{mid})=\text{mid} \{D(x, y); n-Z<=x<=n+Z, m-Z<=y<=m+Z\} \quad (6)$$

The CPU 4 replaces the RGB information of the target pixel TG with that of the candidate pixel according to the following equation 7:

$$R'(n, m)=R(x\text{mid}, y\text{mid}),$$

$$G'(n, m)=G(x\text{mid}, y\text{mid}), \text{ and}$$

$$B'(n, m)=B(x\text{mid}, y\text{mid}). \quad (7)$$

The "intermediate" value may be defined in different ways. The intermediate value may be defined as a value having a substantially center position in the ascending/descending order. For example, suppose that the brightness values are 0, 60, 65, 70, 75, 80, 85, 90, and 100. The intermediate value according to this definition has a center position in the ascending order, and thus, the fifth value of 75 is the intermediate value in this case.

The "intermediate" value may be defined as a value which is the closest to the average of the minimum and maximum values. In such a case, assuming the brightness values are 0, 60, 65, 70, 75, 80, 85, 90, and 100, the intermediate value is 60, which is the closest to the average of (0+100), i.e., 50.

Alternatively, the "intermediate" value may be defined as a value which is the closest to the average of all the values. Using the above values, since the average of 0, 60, 65, 70, 75, 80, 85, 90, and 100 is 69, the intermediate value is 70, which is the closest to 69.

It is noted that in this specification and the appended claims, the "intermediate" value should be interpreted as including the three definitions described above. According to the these three definitions, the intermediate value is, in fact, "intermediate" between the maximum and minimum characteristic values of the pixels contained in the processing mask MSK.

As described above with respect to the three types of the process, the CPU 4 performs calculation depending on the type selected, and stores the replaced RGB information R'(n, m), G'(n, m), B'(n, m) in a separate frame memory in a manner where the replaced RGB information is associated with the corresponding target pixel TG. Again, the original RGB information is kept separately, and unchanged for processing other target pixels as the processing mask continues to shift on a pixel by pixel basis. As such, in the example embodiment, the original RGB information and the replaced RGB information are stored in different memory locations within the main memory 8.

Example Application

Figure 4A:
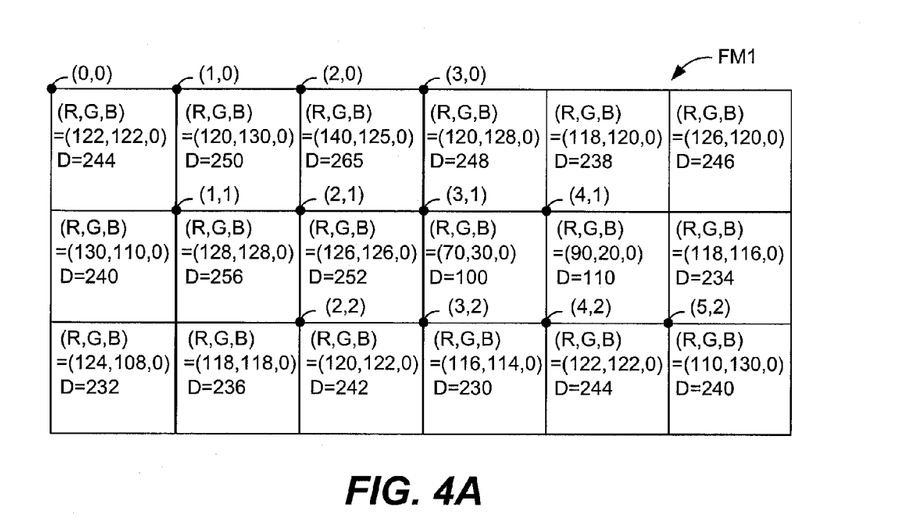
FIGS. 4A and 4B illustrate an example application of the dilating process by the image processor according to an example embodiment of the invention.
Figure 4B:
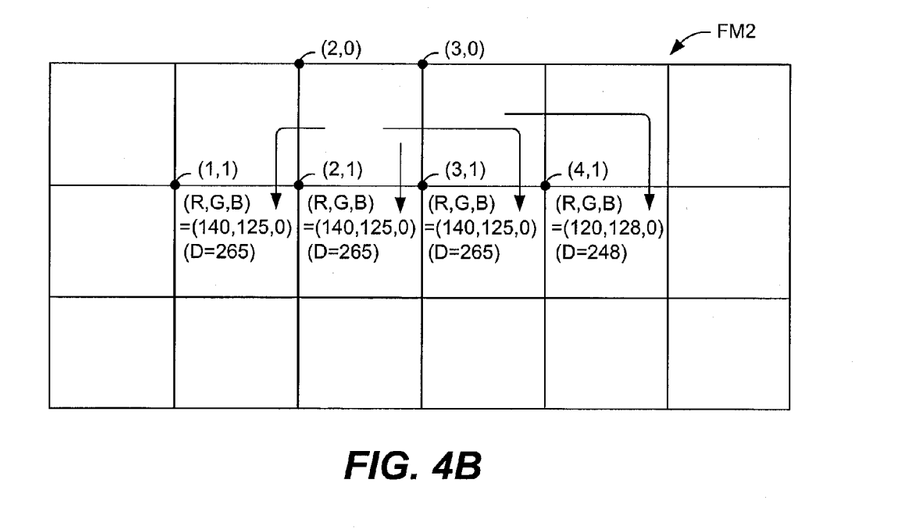

FIGS. 4A and 4B illustrate an example application of the dilating process by the image processor 1 according to an example embodiment of the invention. FIG. 4A illustrates example data of the color image from the image capturing device 2, stored in the frame memory FM1. FIG. 4B illustrates example data of the color image after the replacing process, stored in the frame memory FM2.

Referring to FIG. 4A, the CPU 4 stores the RGB information in a manner where the RGB information is associated with the coordinates of each corresponding pixel of the color image. In FIG. 4A, the brightness D is stored in each pixel in addition to the RGB information in the same frame memory. However, the brightness D may be stored in a separate frame memory, which has a different memory location from the frame memory 8 in the main memory 8.

When the CPU 4 selects the pixel (1, 1) as the target pixel, the processing mask is set to include a square region of which diagonal line is defined by the pixels (0, 0) and (2, 2). The CPU 4 selects the candidate pixel (2, 0) having the maximum brightness value D=265 among the nine pixels. The CPU 4 stores the RGB information of the candidate pixel (2, 0) in the frame memory FM2 in a manner where the RGB information of the candidate pixel (2, 0) is associated with the target pixel (1, 1). Subsequently, the CPU 4 sequentially selects the pixels (1, 1)-(4, 1) as the target pixels, and repeats the dilating process with respect to the target pixels, which is shown in FIG. 4B.

Referring to FIG. 4B, after the replacing process, the RGB information of the pixels (1, 1), (2, 1), (3, 1) is replaced with that of the pixel (2, 0). The RGB information of the pixels (4, 1) is replaced with that of the pixel (3, 0).

Referring back to FIG. 4A, the original image captured by the image capturing device 2 contains relatively dark pixels which have relatively low brightness values of 100 and 110 as compared to those of the proximate pixels. By contrast, referring to FIG. 4B, the pixels (3, 1), and (4, 1) after the dilating process have been replaced with the proximate pixels, which have relatively high brightness values of 265 and 248. In other words, this dilating process is capable of changing a small number of the relatively dark pixels to relatively bright pixels, which are comparative to the neighboring pixels, thereby reducing dark spot noises in the image.

Prioritizing Multiple Candidate Pixels

The example described above assumes that there is only one pixel in the processing mask which has a maximum, minimum, or intermediate value. However, there may be multiple candidate pixels which have the same maximum, minimum, or intermediate value. In such a case, the system can select only one candidate pixel based on the order of the scanning of the processing mask. Alternatively, the system can randomly select only one of the multiple candidate pixels. However, in order to improve the precision of the filtering process, the system may select only one pixel by prioritizing the candidate pixels based on some criteria as described in detail below.

Figure 5:
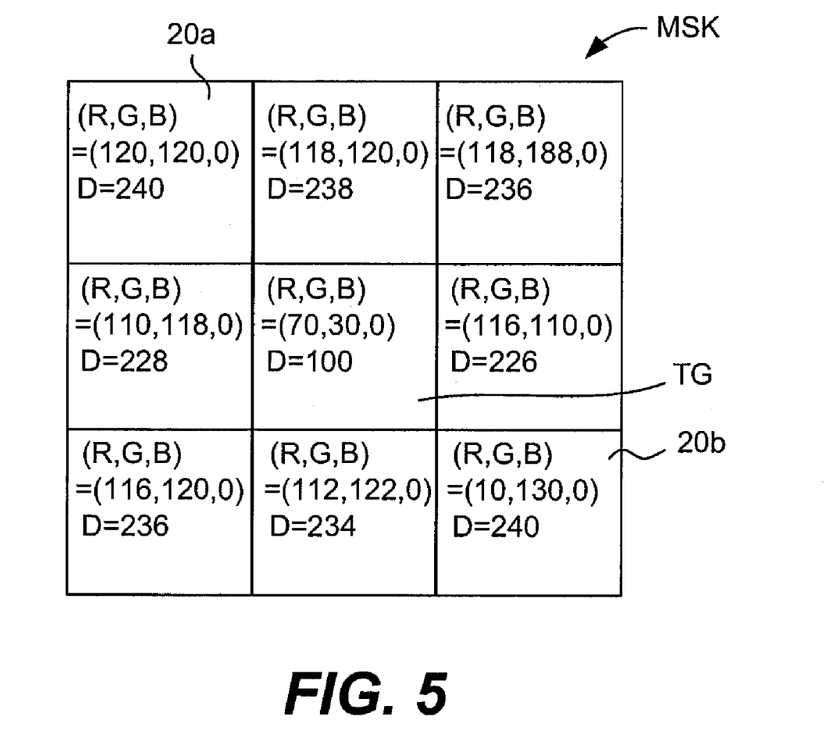
FIG. 5 illustrates an example of the processing mask MSK including multiple pixels having the same brightness.

FIG. 5 illustrates an example of the processing mask MSK including multiple pixels having the same brightness D. Referring to FIG. 5, among the pixels in the processing mask MSK, the maximum brightness value D is 240, which correspond to the pixels 20a and 20b. The CPU 4 need to determine which one of these pixels should be used to replace the target pixel. The CPU 4 stores a prioritizing rule to prioritize the multiple candidate pixels which have the same characteristic value in order to pick one pixel among them.

The example embodiment may utilize various prioritizing rules. For example, one way to prioritizing the multiple candidates is to choose the pixel which has the highest value of the primary color which is the most dominant in the processing mask. For example, when the pixels in the processing mask have relatively high R values, the system prioritizes the candidate pixels based on the R value. In other words, the system selects a pixel which has the highest R value among the candidate pixels.

The candidate pixels may have the same R value in some cases. In such a case, the system determines which primary color is the second most dominant in the processing mask. If the pixels have relatively high G values, for example, the system prioritizes the candidate pixels based on the G values. In other words, the system selects a pixel which has the highest G value among the candidate pixels.

If the R and G values of the candidate pixels are the same, then the B values of the pixels are also the same because, here, the brightness D (i.e., a sum of the R, G, and B values) is the same. As such, in this case, the remaining B values are also the same. If the candidate pixels have the same R, G, and B values, then the pixels represent the same color. Thus, in such a case, any of the candidate pixels is used to replace the target pixel. In view of the foregoing, in order to prioritize the candidate pixels, the system has only to compare two primary colors which are dominant in the processing mask, among the three colors of RGB.

In order to determine which color among RGB is dominant in the processing mask, the system may calculate the average of the R, G, and B values of the pixels in the processing mask, and compare the averaged values of R, G, and B. Thus, the CPU 4 may generate the prioritizing rule automatically without the user input based on which one of the R, G, and B color has the highest average value in the processing mask. Such automatic generation of the prioritizing rule may be beneficial when the dominating color varies depending on the location in the captured image.

Referring to FIG. 5, upon receiving the prioritizing rule described above, the CPU 4 compares the R values of the two candidate pixels 20a and 20b among the R, G, and B values, which is the most dominant color in the processing mask. Here, the pixel 20a has a higher R value (=120) than that of the pixel 20b (=110). Thus, the system selects the candidate pixel 20a to replace the RGB information of the target pixel.

The prioritizing rule described above may be determined before the CPU 4 performs the replacing process. For example, the CPU 4 may display a menu which sets up the prioritizing rule on the display device 3 through the display processor 9 when the CPU 4 is not performing the process. The user may input the prioritizing rule (e.g., a pixel having a higher R value should be prioritized) through the input section 6 according to the menu screen on the display device 3. The CPU 4 receives the prioritizing rule through the input section 6, and stores the rule in the main memory 8 or the auxiliary storage 5. The CPU 4 retrieves the prioritizing rule and use it when performing the replacing process.

Alternatively, the prioritizing rule may be determined based on the "color distance." The color distance is defined as a distance from the standard color in the three-dimensional space having the R, G, and B axes which are orthogonally positioned with each other. Specifically, the color distance L is defined by the following equation 8 where Rs, Gs, and Bs represent the RGB information of the standard color:

$$L^2=(Rs-R)^2+(Gs-G)^2+(Bs-B)^2 \qquad (8)$$

The CPU 4 receives the RGB information of a predetermined standard color. Based on the standard color, the CPU 4 calculates the color distance of the multiple candidate pixels from the standard color to prioritize the candidates. The CPU 4 selects the candidate pixel which has the smallest color distance for the replacing process. The standard color may be set up through the user interface displayed on the display device 3 similar to those described above.

Flowchart

Figure 6:
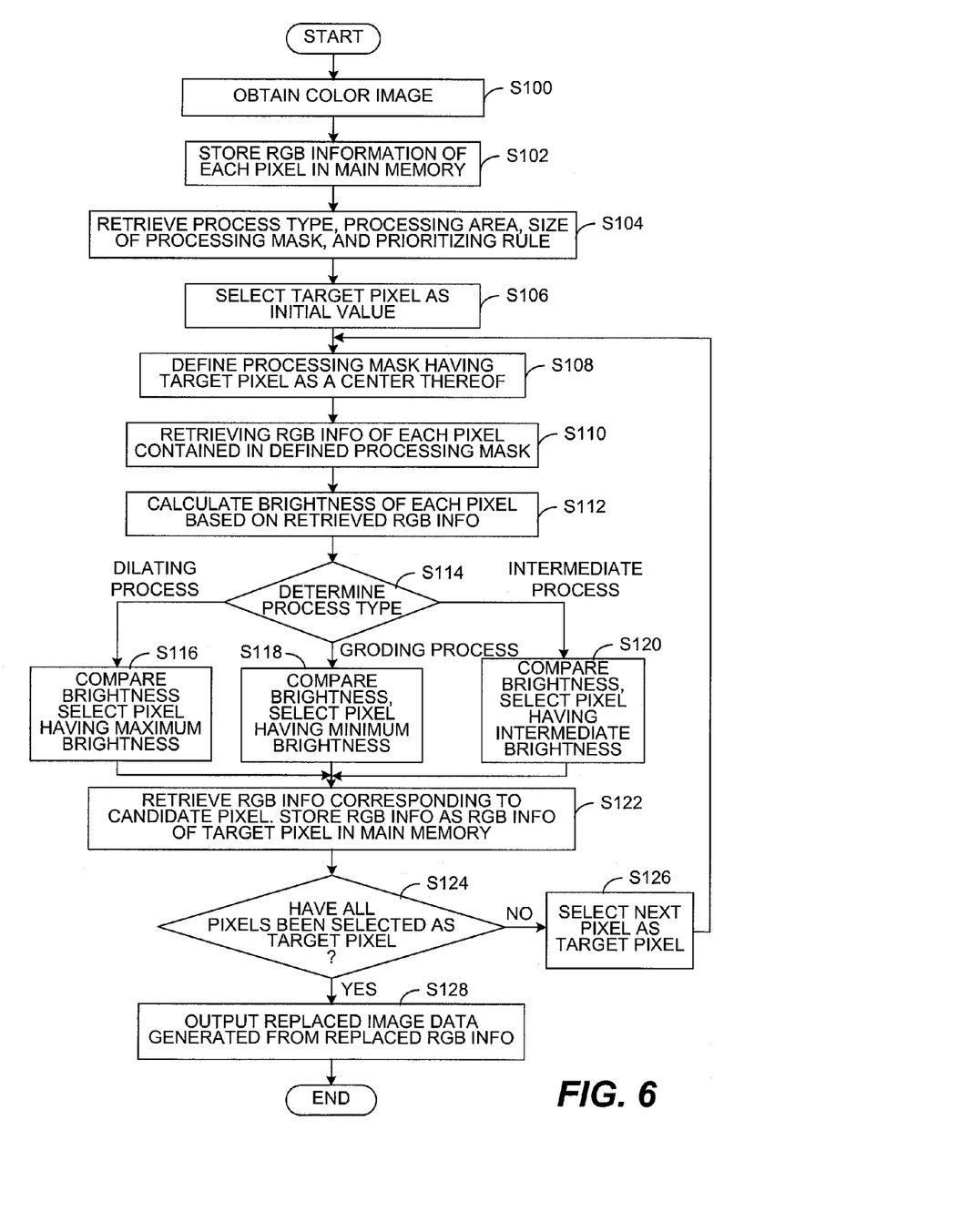
FIG. 6 illustrates a flowchart of the process performed by the CPU.

FIG. 6 illustrates a flowchart of the process performed by the CPU 4. Referring to FIG. 6, the CPU 4 obtains a color image from the image capture device 2 through the image capture I/F 7 (S100). The CPU 4 stores the RGB information of each of the multiple pixels constituting the color image generated by the image capture I/F 7, in the main memory 8 (S102).

The CPU 4 retrieves the process type, the process area, the size of the processing mask, and the prioritizing rule from the main memory 8 or the auxiliary storage 5 (S104). The processing area may be defined based on its starting and ending coordinates (or pixels).

The CPU 4 selects a target pixel as an initial value among the pixels included in the retrieved processing area (S106). The CPU 4 defines the processing mask having the target pixel as a center thereof (S108). The CPU 4 retrieves from the main memory 8 the RGB information of each of the pixels (including the target pixel) contained in the defined processing mask (S110), and calculates the brightness of each pixel based on the retrieved RGB information (S112).

The CPU 4 determines the predetermined type of the process (S114). When the dilating process is selected at S114, the CPU 4 compares the brightness of each pixel, and selects the candidate pixel having the highest brightness value (S116).

When the eroding process is selected at S114, the CPU 4 compares the brightness of each pixel, and selects the candidate pixel having the lowest brightness value (S118).

When the intermediate process is selected at S114, the CPU 4 compares the brightness of each pixel, and selects the candidate pixel having the intermediate brightness value (S120).

The CPU 4 may select only one pixel among multiple candidate pixels based on the predetermined priority rule described above when there are multiple candidate pixels in the processing mask.

The CPU 4 selects a candidate pixel (S116, S118, S120), retrieves the RGB information corresponding to the candidate pixel from the main memory 8, and stores the RGB information as the RGB information of the target pixel (S122).

The CPU 4 then determines whether all pixels in the processing area have been selected as the target pixel (S124). If all pixels in the processing area have not been selected as the target pixel (NO in S124), then the CPU 4 selects the next pixel as the target pixel (S126). The CPU 4 repeats the above S108-S122 until the answer of S124 becomes YES.

If all pixels have been selected as the target pixel (YES in S124), then the CPU 4 retrieves the RGB information after the replacing process which is stored in the main memory 8, and outputs the image data after the replacing process which is generated from the replaced RGB information, to the display device 3 or other devices (S128). Then, the CPU 4 ends the process.

In the example described above, the CPU 4 retrieves the image from the image capturing device 2. However, the source of the image to be processed may be any suitable device. For example, the CPU 4 may retrieve the image from, for example, the main memory 8, the auxiliary memory 5, or the recording medium 12. When the image to be processed is stored in one of these devices or media, the system may perform the dilating or eroding process more than once, and thus, may be capable of achieving higher noise reduction effect.

The example embodiment described above selectively performs one of the three dilating, eroding and intermediate process. However, the system may perform only one of these process.

The CPU 4 may perform pattern searches or edge detection upon the processed image described above. Further, the CPU 4 may output the processed image to an external image processor which performs pattern searches or edge detection on the processed image through the external I/F 10.

In the example embodiment, the RGB information which includes the red, green and blue colors based on the three primary colors is used as color information. However, the color information of the image may be CMY information which includes cyan, magenta, and yellow which are complementary color of the primary colors.

In the example embodiment, the brightness is used as the characteristic value, which is derived as a sum of the RGB values. However, a sum of each of RGB/CMY values each multiplied by a weight value may be used as the characteristic value. Also, values which are derived from the three color variables of hue, value, and chroma may be used.

According to the example embodiment of the invention, the brightness is calculated based on the RGB information of each of the pixels constituting the color image. The brightness values of the pixels in a matrix area are compared. The matrix-shape processing mask has the target pixel as a center thereof. The system selects a candidate pixel which has a value satisfying a process scheme criterion based on the process type to be used.

The RGB information of the target pixel is replaced with the RGB information of the candidate. Therefore, the example embodiment of the invention does not generate false RGB information, and thus, may achieve efficient noise reduction in the image as compared to conventional systems.

According to the example embodiment of the invention, when there are multiple candidate pixels in the processing mask, only one of the candidates is selected based on a predetermined prioritizing rule. Therefore, the system may set up a prioritizing rule which is suitable for noise reduction, thereby further improving the effects of the noise reduction.

According to the example embodiment, the candidate pixel is chosen based on the characteristic value (e.g., the brightness value of the pixel, which is equal to the sum of the R, G, and B values) to replace the RGB information of the target pixel with that of the candidate pixel. As such, the example embodiment is capable of reducing noises in the image efficiently without causing false color effects.

CONCLUSION

Although the foregoing invention has been described in some detail for purposes of clarity of understanding, it will be apparent that certain changes and modifications may be practiced without departing from the spirit and scope of the invention as defined in the claims. Further, features of the invention described herein may be provided alone or in any combination.

What is claimed is:

1. An apparatus for processing an image comprising:
   an interface configured to receive color information including three variables representing a color of each of a plurality of pixels which constitute the image; and
   a processor configured to
   derive a target characteristic value corresponding to a target pixel among the plurality of pixels based on the three variables of the target pixel,
   derive proximate characteristic values corresponding to a plurality of proximate pixels which are proximate to the target pixel, and
   replace the three variables of the target pixel with the three variables of one of the proximate pixels depending on a relationship between the target characteristic value and the proximate characteristic values.

2. The apparatus of claim 1, wherein the target characteristic value, and the proximate characteristic values are defined as brightness of the target pixel, and the proximate pixels, respectively.

3. The apparatus of claim 1, wherein the processor is further configured to
   identify the plurality of proximate pixels based on relative positional relationship thereof with respect to the target pixel,
   select a candidate pixel among the identified proximate pixels for the replacement when the selected candidate pixel is ranked at a predetermined position within a distribution of the proximate characteristic values.

4. The apparatus of claim 3, wherein the predetermined position within the distribution of the proximate characteristic values is determined externally.

5. The apparatus of claim 4, wherein the predetermined position within the distribution of the proximate characteristic values is substantially equal to one of a maximum value, an intermediate value, or a minimum value of the proximate characteristic values.

6. The apparatus of claim 5, wherein
   if multiple candidate pixels are ranked at a same position within the distribution of the proximate characteristic values, then only one of the candidate pixels is selected for the replacement based on at least one of the three variables of the candidate pixels.

7. The apparatus of claim 6, wherein the proximate pixels are located within a rectangular area having the target pixel as a center, which includes n pixels x n pixels where n is an odd number, and equal to or more than 3.

8. The apparatus of claim 6, wherein the three variables correspond to gray scale values of red, green, and blue colors.

9. A method for processing an image comprising:
   using an interface for receiving color information including three variables representing a color of each of a plurality of pixels which constitute the image;
   using a processor deriving a target characteristic value corresponding to a target pixel among the plurality of pixels based on the three variables of the target pixel;
   deriving proximate characteristic values corresponding to a plurality of proximate pixels which are proximate to the target pixel; and
   replacing the three variables of the target pixel with the three variables of one of the proximate pixels depending on a relationship between the target characteristic value and the proximate characteristic values.

10. The method of claim 9, wherein the target characteristic value, and the proximate characteristic values are defined as brightness of the target pixel, and the proximate pixels, respectively.

11. The method of claim 9, further comprising:
    identifying the plurality of proximate pixels based on relative positional relationship thereof with respect to the target pixel; and
    selecting a candidate pixel among the identified proximate pixels for the replacement when the selected candidate pixel is ranked at a predetermined position within a distribution of the proximate characteristic values.

12. The method of claim 11, wherein the predetermined position within the distribution of the proximate characteristic values is determined externally.

13. The method of claim 12, wherein the predetermined position within the distribution of the proximate characteristic values is substantially equal to one of a maximum value, an intermediate value, or a minimum value of the proximate characteristic values.

14. The method of claim 13, wherein
    if multiple candidate pixels are ranked at a same position within the distribution of the proximate characteristic values, then only one of the candidate pixels is selected for the replacement based on at least one of the three variables of the candidate pixels.

15. The method of claim 14, wherein the proximate pixels are located within a rectangular area having the target pixel as a center, which includes n pixels xn pixels where n is an odd number, and equal to or more than 3.

16. The method of claim 14, wherein the three variables correspond to gray scale values of red, green, and blue colors.

17. Software encoded in one or more computer readable media and when a computer is executed operable to:
    receive color information including three variables representing a color of each of a plurality of pixels which constitute the image;
    derive a target characteristic value corresponding to a target pixel among the plurality of pixels based on the three variables of the target pixel;
    derive proximate characteristic values corresponding to a plurality of proximate pixels which are proximate to the target pixel; and
    replace the three variables of the target pixel with the three variables of one of the proximate pixels depending on a relationship between the target characteristic value and the proximate characteristic values.

* * * * *